May 8, 1934. P. J. SOMMERFELDT 1,957,620
POWER MOWING MACHINE
Filed Jan. 24, 1933 4 Sheets-Sheet 1
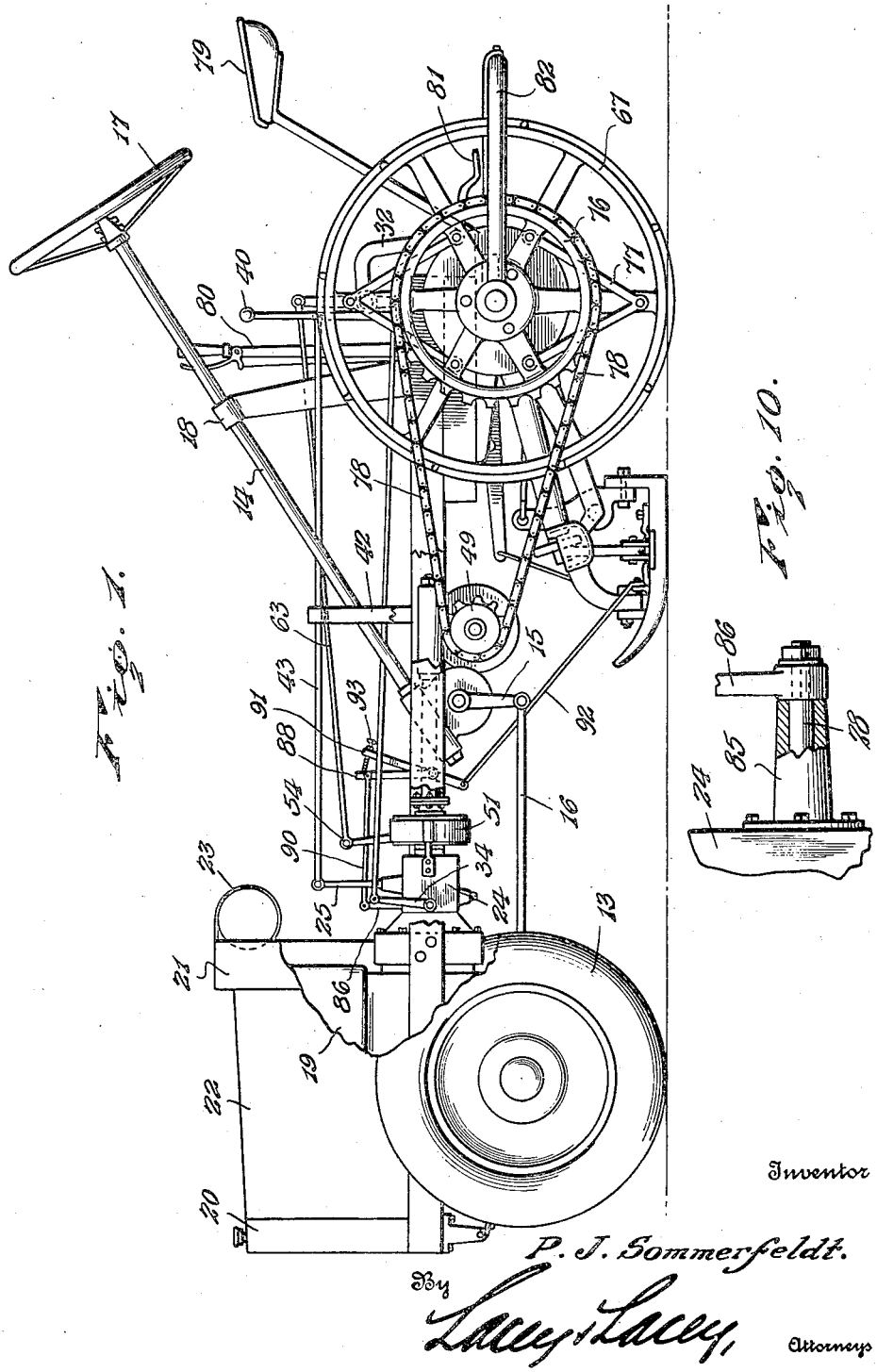
Inventor
P. J. Sommerfeldt.
By Lacey & Lacey, Attorneys

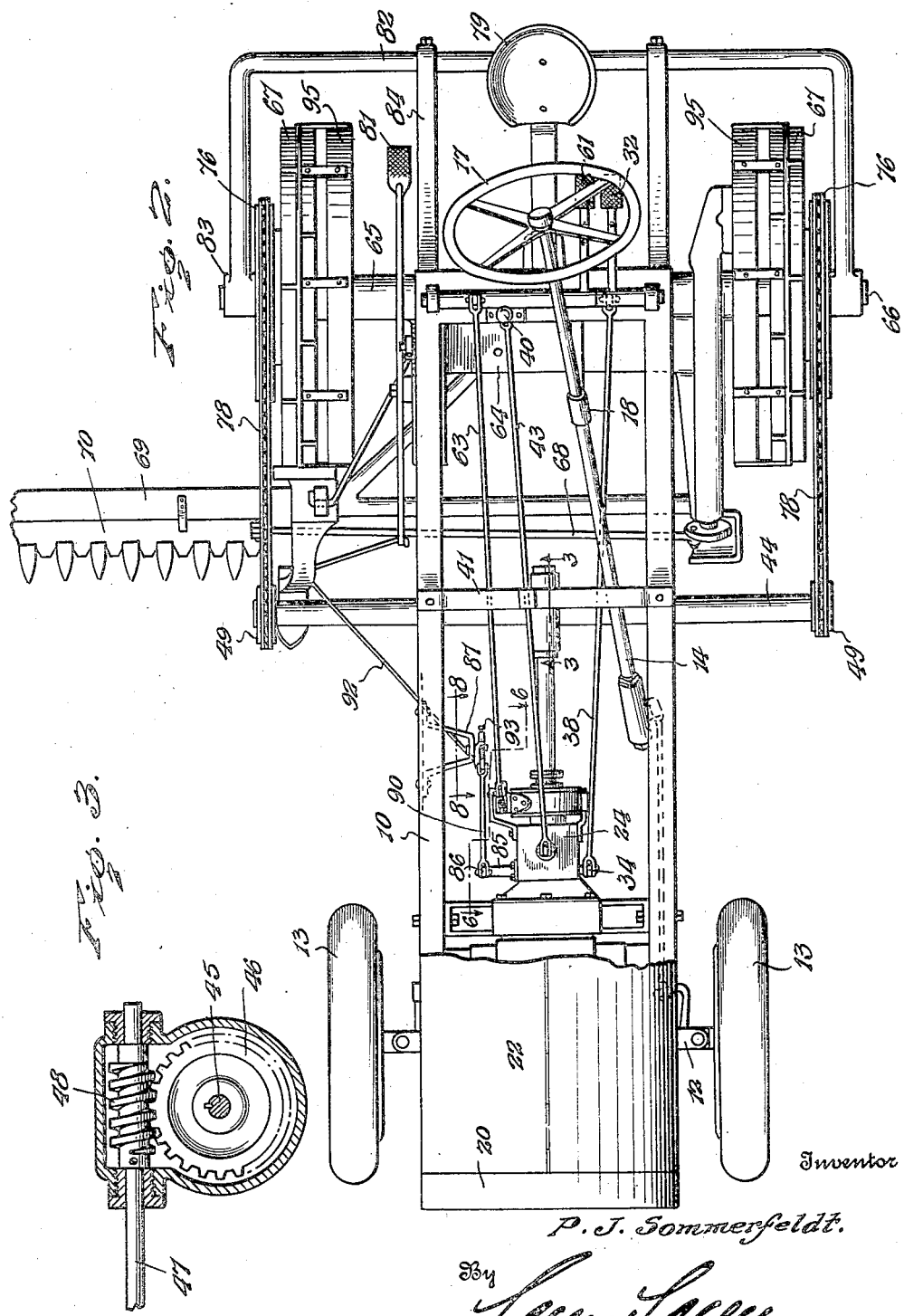

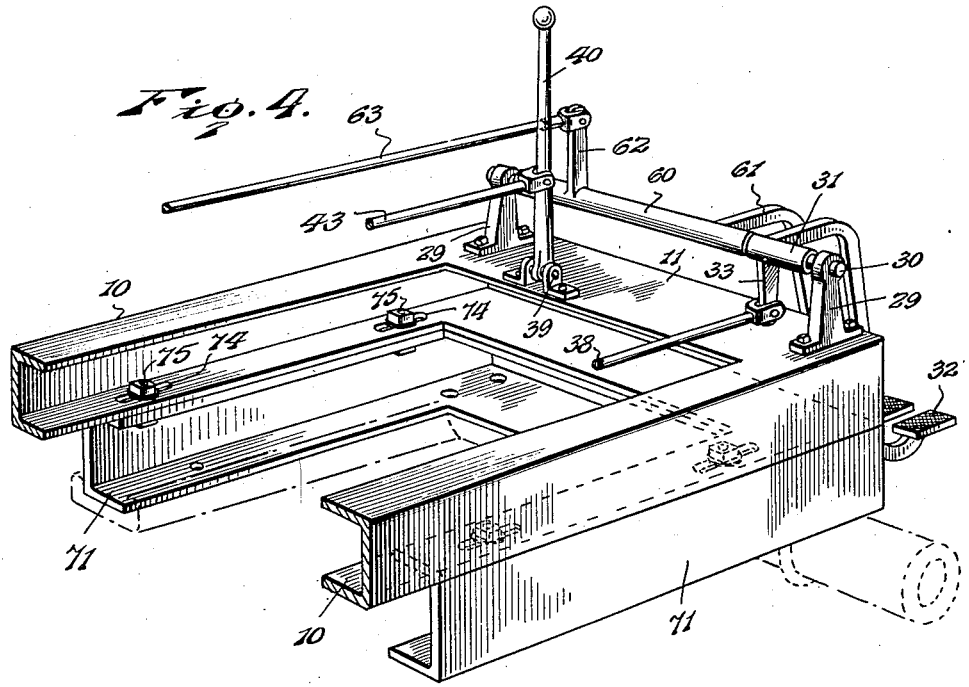
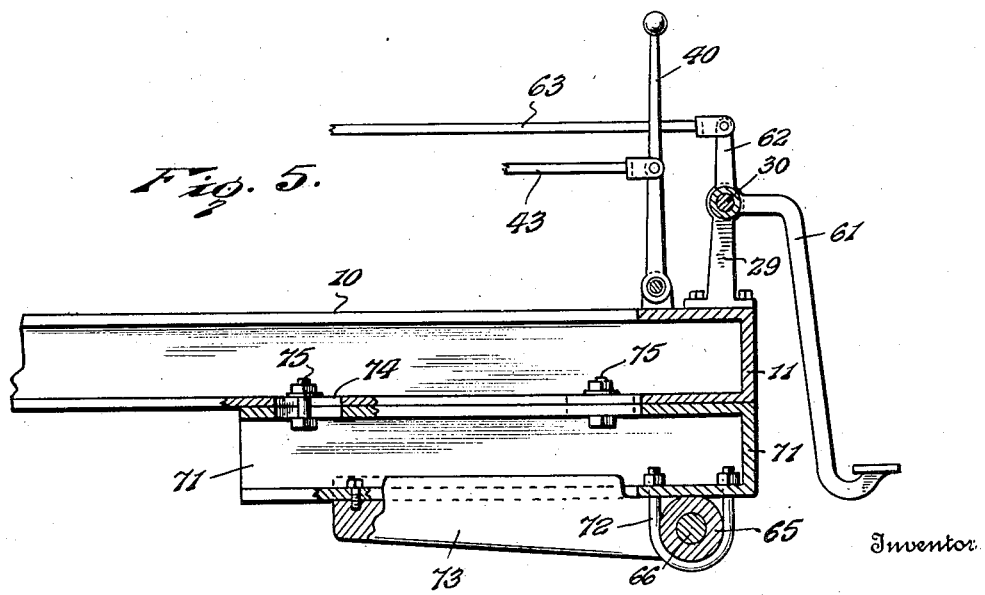

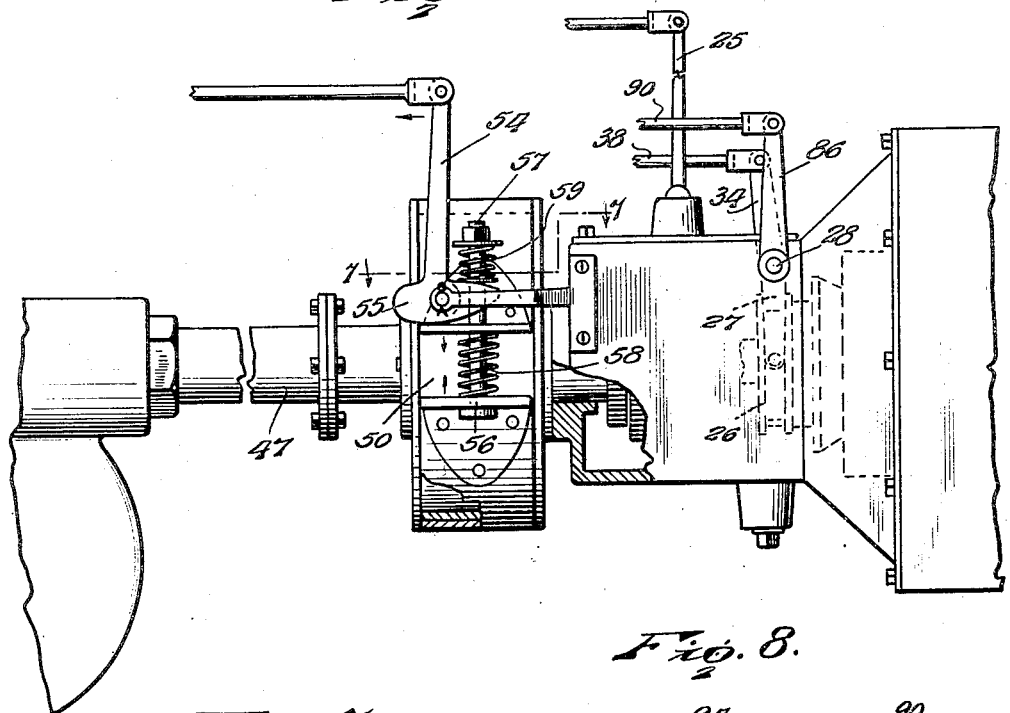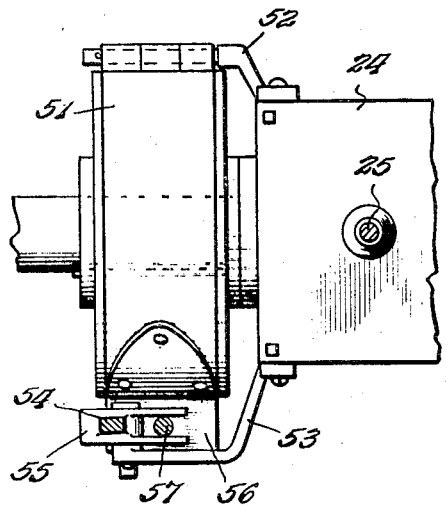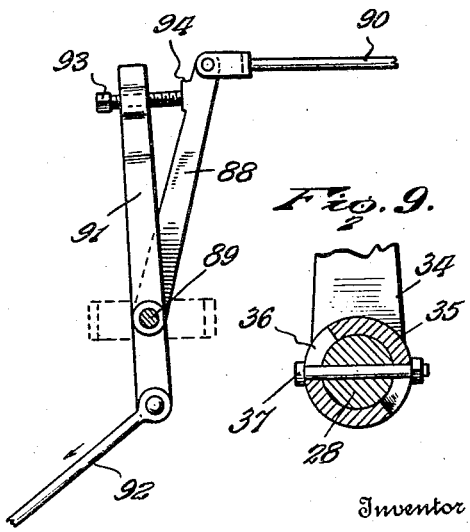

Patented May 8, 1934

1,957,620

UNITED STATES PATENT OFFICE 1,957,620

POWER MOWING MACHINE

Paul J. Sommerfeldt, Manistee, Mich.

Application January 24, 1933, Serial No. 653,315

7 Claims. (Cl. 56—25)

This invention relates to an improved power mowing machine and seeks, among other objects, to provide a machine wherein the engine and a portion of the chassis of a conventional motor truck may be connected to an ordinary mower to provide an efficient motorized unit.

The invention seeks, as a further object, to provide a machine wherein the mower wheels will be driven by the motor through suitable sprocket chains and wherein means will be provided for adjustably taking up slack in said chains.

A further object of the invention is to provide a machine wherein the drive clutch may be conveniently controlled from the driver's seat and wherein means will also be provided for automatically releasing the clutch and thus stopping the machine should the cutter bar meet with an obstruction.

And the invention seeks, as a still further object, to provide a suitable brake mechanism for the machine as well as to provide means whereby the gear shift may be conveniently actuated from the driver's seat.

Other and incidental objects not specifically mentioned in the foregoing will be apparent during the course of the following description.

In the accompanying drawings,

Figure 1 is a side elevation of my improved machine,

Figure 2 is a plan view of the machine,

Figure 3 is a detail section on the line 3—3 of Figure 2 showing the worm drive, Figure 4 is a fragmentary perspective view showing the connection between the bed frame of the mower and the chassis frame of the truck, Figure 5 is a fragmentary sectional view showing the adjustable connection between the bed frame of the mower and the chassis frame of the truck, Figure 6 is a fragmentary sectional view on the line 6—6 of Figure 2, particularly showing the brake, Figure 7 is a sectional view on the line 7—7 of Figure 6, Figure 8 is an enlarged sectional view on the line 8—8 of Figure 2 showing the clutch actuating levers, Figure 9 is a detail section showing the connection between the foot operated clutch lever and the clutch shaft, and Figure 10 is a detail view showing the end of the clutch shaft opposite to that illustrated in Figure 9.

In carrying the invention into effect, I employ an oblong chassis frame 10 which is preferably channel shaped in cross section and is provided with a rear end bar 11 and suitably connected with the forward end portion of said frame is a front axle 12 to which are connected front wheels 13. The construction of the axle as well as the front wheels is unimportant except to note that said wheels are mounted to be directed by a suitable steering gear. The structural details of the steering gear is also unimportant. However, I have shown a steering post 14 which may be rotated to rock a crank 15 and connected to such crank is a drag link 16 in turn connected appropriately with the wheels 13, for steering said wheels. The steering post 14 extends upwardly and rearwardly at a suitable angle and carries at its upper end a steering wheel 17. Attached to the bar 11 of the frame 10 is a bracket 18 rigidly supporting the rear end portion of the steering post.

Appropriately mounted between the side bars of the frame 10, at the forward end thereof, is a suitable engine or power unit 19. This power unit may be of any appropriate design and, in the present instance, I have shown a radiator 20 at the forward end of said unit and a dash 21 at the rear end thereof, a hood 22 extending between the radiator and dash, which latter preferably carries a fuel tank 23.

Immediately in the rear of the power unit is a variable speed transmission, indicated as a whole at 24. This transmission may be of any suitable construction and includes the usual gear shift lever 25 operable in the customary manner for selecting the different speeds and, of course, said lever may also be moved to a neutral position for rendering the transmission inactive. As is customary, a clutch is provided between the crank shaft of the power unit 19 and the transmission but as this clutch may be of any suitable construction it is not shown in detail. However, it may be noted, as seen in dotted lines in Fig. 6, that the clutch comprises a collar 26 engaged by a yoke 27 in turn carried by a shaft 28 journaled through the housing of the transmission 24. This shaft may be rocked forwardly, as is customary, for rendering the clutch inactive and for the purposes of the present invention the shaft 28 is formed to extend clear through the housing of the transmission to project at opposite sides thereof.

Mounted upon the chassis frame 10, at its rear end, as particularly seen in Fig. 4, is a pair of upstanding posts 29 and extending between said posts is a shaft 30. Mounted to rock upon one end portion of the shaft is a sleeve 31 from which extends rearwardly a clutch pedal 32 and depending from said sleeve is a crank 33. Connected with the adjacent end of the clutch shaft 28, as best seen in Fig. 9, is an upstanding lever 34 having a hub 35 swiveled upon said shaft and formed in said hub are slots 36. Extending through the shaft and freely through said slots is a bolt or pin 37 and connecting the crank 33 with the lever 34 is a rod 38. Accordingly, as will be seen, when the pedal 32 is depressed the lever 34 will be rocked forwardly, whereupon the hub 35 of the lever 34 will act on the pin 37 for rocking the clutch shaft 28 forwardly to disengage the clutch. However, as will be perceived, the shaft 28 may, due to the slot and pin connection between said shaft and the lever 34, be rocked forwardly independently of said lever.

Fixed to the rear end bar 11 of the frame 10, as particularly seen in Fig. 4, are spaced brackets 39, and pivoted at its lower end, between said brackets, is a gear shift lever 40. Extending transversely between the side bars of the frame 10, medially thereof, is a cross plate 41 from which rises, as particularly seen in Fig. 1, a post 42, and extending from the lever 40, at a point medially thereof, freely through the upper end of said post, is a rod 43 connected to the upper end of the lever 25. The lever 40 is mounted at its lower end so that said lever may not only be rocked forwardly and rearwardly but may also be rocked from side to side and the post 42 will provide a fulcrum for the rod 43 so that the lever 40 may be operated, as will be readily understood, to actuate the lever 25 for selecting the different speeds of the transmission 24.

Extending transversely of the frame 10, medially thereof, is an axle housing 44 secured beneath the frame by U-bolts or other suitable fastening devices engaged with the side bars of the frame. Journaled through said housing is an axle shaft 45 and associated with said shaft, medially thereof, is a suitable differential gearing including a worm gear 46, the housing being formed to enclose said gearing. Extending rearwardly from the transmission 24 is a propeller shaft 47 which, as seen in Fig. 3, extends over the worm gear 46 and mounted on the shaft 47 is a worm 48 to coact with said gear. Accordingly, when the clutch of the variable speed transmission is engaged and the lever 40 shifted to select a desired speed gear, the shaft 45 will be driven by the power unit 19. Fixed to the ends of the shaft 45 are sprockets 49.

Interposed in the shaft 47 is a brake drum 50 and surrounding said drum is a brake band 51. Supporting the brake band at one side of the drum is, as seen in Fig. 7, a bracket 52 attached to the adjacent side of the housing of the transmission 24 and fixed to said housing, at its opposite side, is a bracket 53 upon which is pivoted a lever 54 having a cam shaped foot 55 bifurcated at its forward end. The brake band 51 is provided at its ends with ears 56 and extending freely through said ears and between the bifurcations of the foot 55 of the lever 54 is a bolt 57. Surrounding the bolt 57, between the ears 56, is a spring 58 and surrounding the upper end portion of the bolt to act against the bifurcations of the foot 55 is a similar spring 59. As will be observed, the cam face of the foot 55 is presented to the uppermost of the ears 56 of the brake band so that when the lever 54 is rocked rearwardly said cam face will shift the uppermost ear downwardly while the bifurcations of the foot 55 will press upwardly on the spring 59 for forcing the bolt 57 upwardly with the result that the lowermost of the ears 56 will be shifted upwardly. Consequently, the ears 56 will, when the lever 54 is rocked rearwardly, be moved towards each other for tightening the brake band 51 about the drum 50 for braking the machine. Upon release of the lever 54, the spring 58 will move the ears 56 of the brake band apart for expanding the brake band and releasing the brake while the spring 59 will press downwardly on the bifurcations of the foot 55 of the lever 54 for rocking the lever forwardly to normal position. Mounted to rock upon the adjacent end of the shaft 30, as seen in Fig. 4, is a sleeve 60 from which projects rearwardly a brake pedal 61 and upstanding from said sleeve is a crank 62. Extending between said crank and the lever 54 is a rod 63. Thus, as will be perceived, the pedal 61 may be depressed for tightening the brake band 51 and applying the brake.

Connected with the rear end portion of the chassis frame 10 is a mower. In most respects, this mower may be of conventional construction and it is, therefore, unnecessary to describe the mower in all its details. In the present instance, I have shown a mower frame 64 including an axle housing 65 and extending through said housing is an axle 66 carrying drive wheels 67 connected with the axle by the usual ratchets, as is ordinary in mower construction, to permit either wheel to rotate faster or slower than the other. Thus, forward motion of the wheels 67 will rotate the axle which, through suitable gearing, is utilized to drive a pitman 68, and swingingly connected with the forward portion of the frame 64 at one side of the mower is the usual cutter bar 69 carrying a knife 70 reciprocated by the pitman. As previously indicated, all of this structure is conventional.

In conjunction with the mower frame 64, I provide a substantially U-shaped bed frame 71, particularly seen in Figs. 4 and 5 of the drawings. This bed frame is preferably channel shaped in cross section and connecting said frame with the axle housing 65 of the mower frame are spaced U-bolts 72 embracing said housing. As is customary, the mower frame 64 is provided with the usual arm 73 which projects forwardly to receive the mower tongue, under ordinary circumstances, but, in the present instance, one side bar of the frame 71 is, as seen in Fig. 5, seated between the side flanges of said arm and is bolted or otherwise fixed to the arm. Thus, the frame 71 is rigidly connected to the mower and, as brought out in Fig. 4, said frame is of a size to mate with the rear end portion of the chassis frame 10. Formed in the bottom flanges of the side bars of the frame 10 and in the top flanges of the side bars of the frame 71 are mating slots 74 and extending through said slots are bolts 75 rigidly securing the frames together while, however, as will be appreciated, the frame 71 may be adjusted either forwardly or rearwardly with respect to the frame 10.

For the purposes of the present invention, the axle 66 of the mower is of a length to extend through the hub of the wheels 67, and mounted upon the projecting end portions of said axle are sprockets 76 bolted to the wheels. Pairs of braces 77 are also employed. As seen in Fig. 1, the braces of each pair are secured at their outer ends to a single spoke of one of the mower wheels and diverge towards their inner ends and are secured to spaced spokes of one of the sprockets, two pairs of braces being employed in connection with each sprocket. Thus, as will be seen, these braces will tend to absorb torsional strain on the sprockets. Extending between the sprockets 49 and 76 are sprocket chains 78. Thus, as will be appreciated, in view of the foregoing description, the machine may be propelled forwardly by the power unit 19 and the mower will be set into operation by the turning of the drive wheels 67 for reciprocating the knife 70, and connected with the mower frame is an appropriate seat 79 convenient to the steering wheel 17 so that the operator may guide the machine as well as operate the shift lever 40, clutch pedal 32 and brake pedal 61. As is customary, the mower is equipped with a hand lever 80 which is appropriately connected with the cutter bar 69 for swinging said bar upwardly to inactive position and is also equipped with an appropriate foot lever 81 likewise suitably connected with the cutter bar so that by depressing the rear end of said lever with the foot the bar may be quickly tilted upwardly to clear an obstruction. Bracing the ends of the axle 66 is a U-shaped brace member 82 provided at its ends with bearings 83 journaling the ends of the axle and extending between the straight intermediate portion of the brace 82 and the mower frame 64 are straps 84 supporting the brace 82 in horizontal position at the rear of the mower. The mower will thus function efficiently as it is propelled forwardly and attention is directed to the fact that should wear develop in the sprocket chains, the bed frame 71 may be adjusted rearwardly on the chassis frame 10 for taking up such wear.

Fixed to the side of the transmission housing remote from the lever 34, as particularly seen in Fig. 10, is a bearing 85 for the adjacent projecting portion of the clutch shaft 28 and fixed to the contiguous end of the shaft is an upstanding lever 86. Secured to the adjacent side bar of the chassis frame 10, rearwardly of the plane of the lever 86, is an inwardly projecting bracket 87 and supported by the bracket is an upstanding lever 88 connected with the bracket by a bolt 89. Extending between the upper end of the lever 88 and the lever 86 is a rod 90 and pivoted upon the bolt 89 is a second lever 91. Extending between the lower end of the lever 91 and the usual shoe at the inner end of the cutter bar 69 is a rod 92 connected close to the pivot of the cutter bar so that the raising or lowering of said bar will not affect the rod. At is upper end, the lever 91 is offset to extend behind the lever 88 and is equipped with a set screw 93 to engage a shoulder 94 on the lever 88. Thus, should the cutter bar encounter an obstruction, as the machine is propelled forwardly, the rearward strain on the cutter bar will exert a pulling force on the rod 92 with the result that the upper end of the lever 91 will be rocked forwardly so that the screw 93 will act on the upper end of the lever 88 to rock this latter lever forwardly and, consequently, rock the lever 86 forwardly to release the clutch of the variable speed transmission. Accordingly, the power unit 19 will be disconnected from the propeller shaft so that, under ordinary circumstances, the machine will be automatically stopped. Injury which might otherwise result to the cutter bar and knife of the mower will be obviated and in this connection, it is to be observed that the slots 36 in the hub 35 of the foot operated lever 34 will accommodate rocking movement of the clutch shaft 28 when actuated by the lever 91 while, when the shaft 28 is actuated by the lever 34, the lever 88 will simply rock forwardly away from the set screw 93.

Extension rims 95 are preferably provided in connection with the mower wheels 67 so as to afford better traction as well as facilitate the operation of the machine on soft ground. As will be well understood in view of the foregoing description, the direction of movement of the machine may be readily reversed when so desired so that should the cutter bar 69 strike an obstruction in the operation of the machine, the machine may be readily backed away to free the cutter bar.

Having thus described the invention, I claim:

1. A power mowing machine including a chassis frame, front ground wheels connected therewith, means for steering said wheels, a bed frame fixed to the underside of the chassis frame at the rear end thereof, a mower frame rigidly secured to the bed frame, a drive axle journaled on the mower frame, drive wheels carried by said axle, a cutter, means operable by the drive axle for operating the cutter, a power unit carried by the front end of the chassis frame, an axle shaft mounted on the chassis frame in advance of the mower frame and driven by said unit, and an operative connection between said shaft and the drive wheels of the mower.

2. A power mowing machine including a chassis frame, front ground wheels connected therewith, means for steering said wheels, a bed frame disposed on the underside of the chassis frame at the rear end thereof, a mower frame rigidly secured to the bed frame, a drive axle journaled on the mower frame, drive wheels carried by said axle, a cutter, means operable by the drive axle for operating the cutter, a power unit carried by the forward portion of the chassis frame, an axle shaft on the chassis frame in advance of the mower frame and driven by said unit, sprockets on the axle shaft, sprockets connected with the drive wheels, sprocket chains trained about said sprockets, and means adjustably connecting the bed frame with the chassis frame whereby the bed frame may be shifted longitudinally for tightening said sprocket chains.

3. A power mowing machine including a chassis frame, front ground wheels connected therewith, means for steering said wheels, a bed frame fixed to the underside of the chassis frame at the rear end thereof, a mower frame rigidly connected to the bed frame, a drive axle journaled on the mower frame, drive wheels carried by said axle, a cutter carried by the mower frame, means operable by the drive axle for operating the cutter, a power unit carried by the forward portion of the chassis frame, an axle housing fixed to the chassis frame in advance of the mower frame, an axle shaft journaled in said housing and including a differential gearing, a driving connection between said power unit and said gearing, and an operative connection between the ends of said axle shaft and the drive wheels of the mower.

4. A power mowing machine including a chassis frame, front ground wheels connected therewith, means for steering said wheels, a bed frame fixed to the underside of the chassis frame, a mower frame rigidly connected to the bed frame, a drive axle journaled on the mower frame, drive wheels carried by said axle, a cutter carried by the mower frame, means operable by the drive axle for operating the cutter, a power unit carried by the forward portion of the chassis frame, an axle shaft mounted on the chassis frame in advance of the mower frame, a driving connection between said unit and said axle shaft including a clutch, a brake drum interposed in said connection, a brake band cooperating with said drum, means at the rear end of the chassis frame for tightening said band for braking the machine, and an operative connection between said axle shaft and the drive wheels of the mower.

5. A power mowing machine including a chassis frame, front ground wheels connected therewith, means for steering said wheels, a bed frame fixed to the chassis frame, a mower frame rigidly connected to the bed frame, a drive axle journaled on the mower frame, drive wheels carried by said axle, a cutter carried by the mower frame, means operable by the drive axle for operating the cutter, a power unit carried by the chassis frame, an axle shaft, a driving connection between said unit and said shaft including a clutch, manually operable means for releasing said clutch, means operable by the cutter for releasing the clutch independently of said manually operable means, and an operative connection between said axle shaft and the drive wheels of the mower.

6. A power mowing machine including a chassis frame, front ground wheels connected therewith, means for steering said wheels, a bed frame fixed to the chassis frame, a mower frame rigidly connected to the bed frame, a drive axle journaled on the mower frame, drive wheels carried by said axle, a cutter carried by the mower frame, means operable by the drive axle for operating the cutter, a power unit carried by the chassis frame, an axle shaft, a driving connection between said unit and said shaft including a clutch, a clutch shaft adapted to be rocked for releasing the clutch, a manually operable lever for rocking the clutch shaft, means connecting said lever with the clutch shaft whereby the clutch shaft may be rocked independently of said lever, a second lever fixed to the clutch shaft, an operative connection between the cutter and the latter lever whereby a rearward pull on the cutter will rock the clutch shaft and release the clutch independently of said first-mentioned lever, and an operative connection between said axle shaft and the drive wheels of the mower.

7. A mowing machine comprising a chassis frame, ground wheels supporting the front end of said frame, means for steering said wheels, a bed frame fixed to the rear end of the chassis frame, a mower frame secured to the bed frame, a cutter carried by the mower frame, ground wheels on the mower frame, means driven by said ground wheels to operate the cutter, a shaft on the chassis frame in advance of the mower frame and connected with the ground wheels on the mower frame to drive the same, a power unit on the forward portion of the chassis frame, connections between said unit and said shaft for driving the shaft, said connections including a transmission, a clutch, and a brake. levers connected with the clutch and brake respectively, a gear shift lever mounted at the transmission, a lever mounted on the rear end of the chassis frame and connected with the gear shift lever, and pendent pedals mounted on the rear end of the chassis frame and connected respectively with the clutch lever and the brake lever.

PAUL J. SOMMERFELDT. [L. S.]